United States Patent [19]

Applegate

[11] 4,181,318

[45] Jan. 1, 1980

[54] VEHICLE WHEEL STEERING STABILIZER

[76] Inventor: Richard E. Applegate, 9521 Helena St., Montclair, Calif. 91763

[21] Appl. No.: 866,388

[22] Filed: Jan. 3, 1978

[51] Int. Cl.$^2$ ............................................... B62D 7/08
[52] U.S. Cl. ....................................... 280/94; 267/150
[58] Field of Search ................. 280/94, 268, 660, 718, 280/776, 89; 267/150

[56] References Cited

U.S. PATENT DOCUMENTS

| | | | |
|---|---|---|---|
| 1,407,579 | 2/1922 | Robinson | 280/94 |
| 3,448,991 | 6/1969 | Leggett | 280/94 |
| 3,848,885 | 11/1974 | Hefren | 280/94 |
| 3,980,315 | 9/1976 | Hefren | 280/94 |

FOREIGN PATENT DOCUMENTS

2592  7/1927  Australia ..................................... 280/94

*Primary Examiner*—John A. Pekar
*Assistant Examiner*—Michael Mar
*Attorney, Agent, or Firm*—Boniard I. Brown

[57] ABSTRACT

A front wheel steering stabilizer for automotive vehicles with a rigid front axle. The stabilizer is operatively connected between the axle and the steering wheel king nut and exerts on the wheel, in offset relation to its steering axis, a spring force for urging the wheel to a neutral position about the steering axis.

10 Claims, 9 Drawing Figures

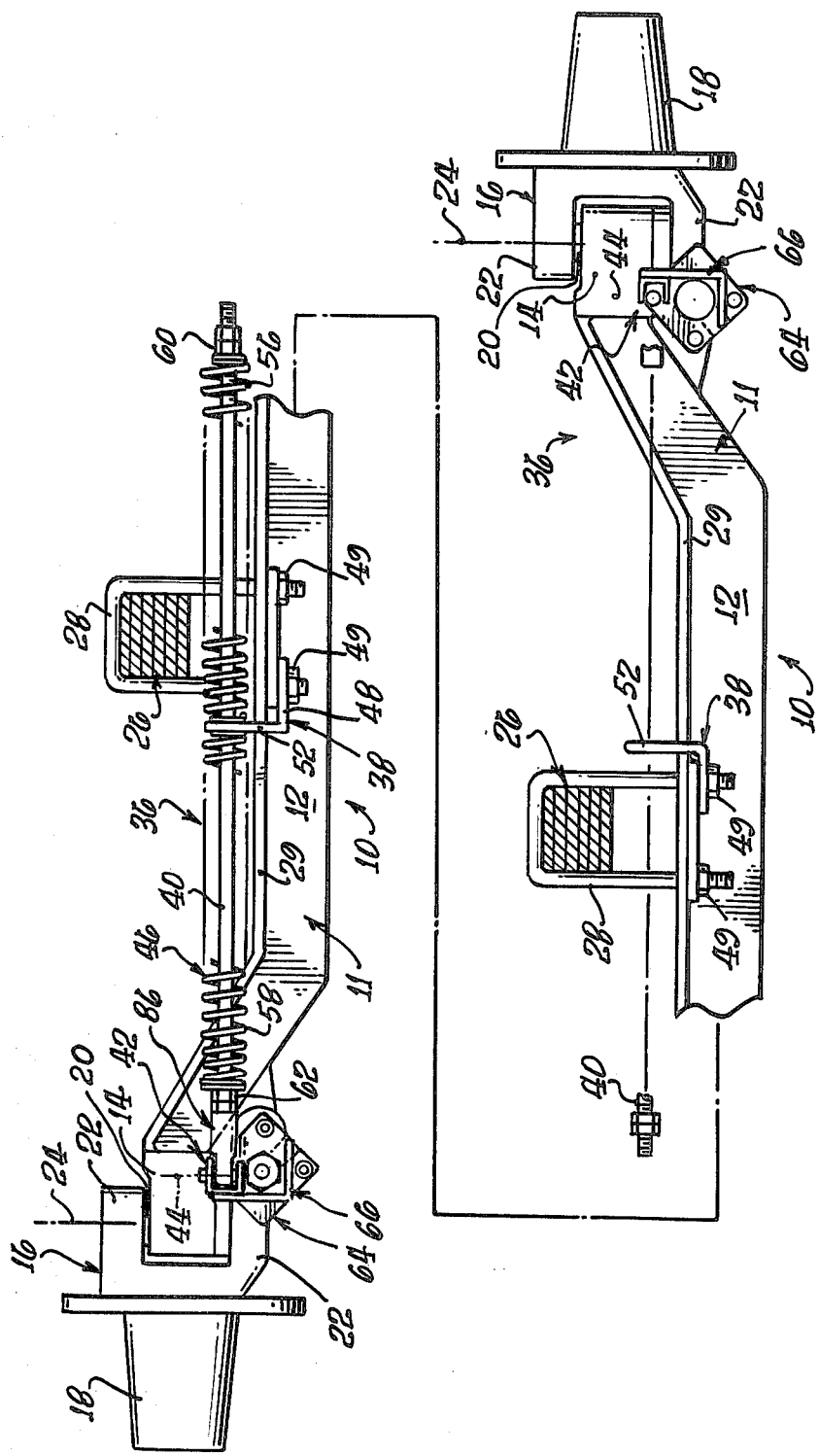

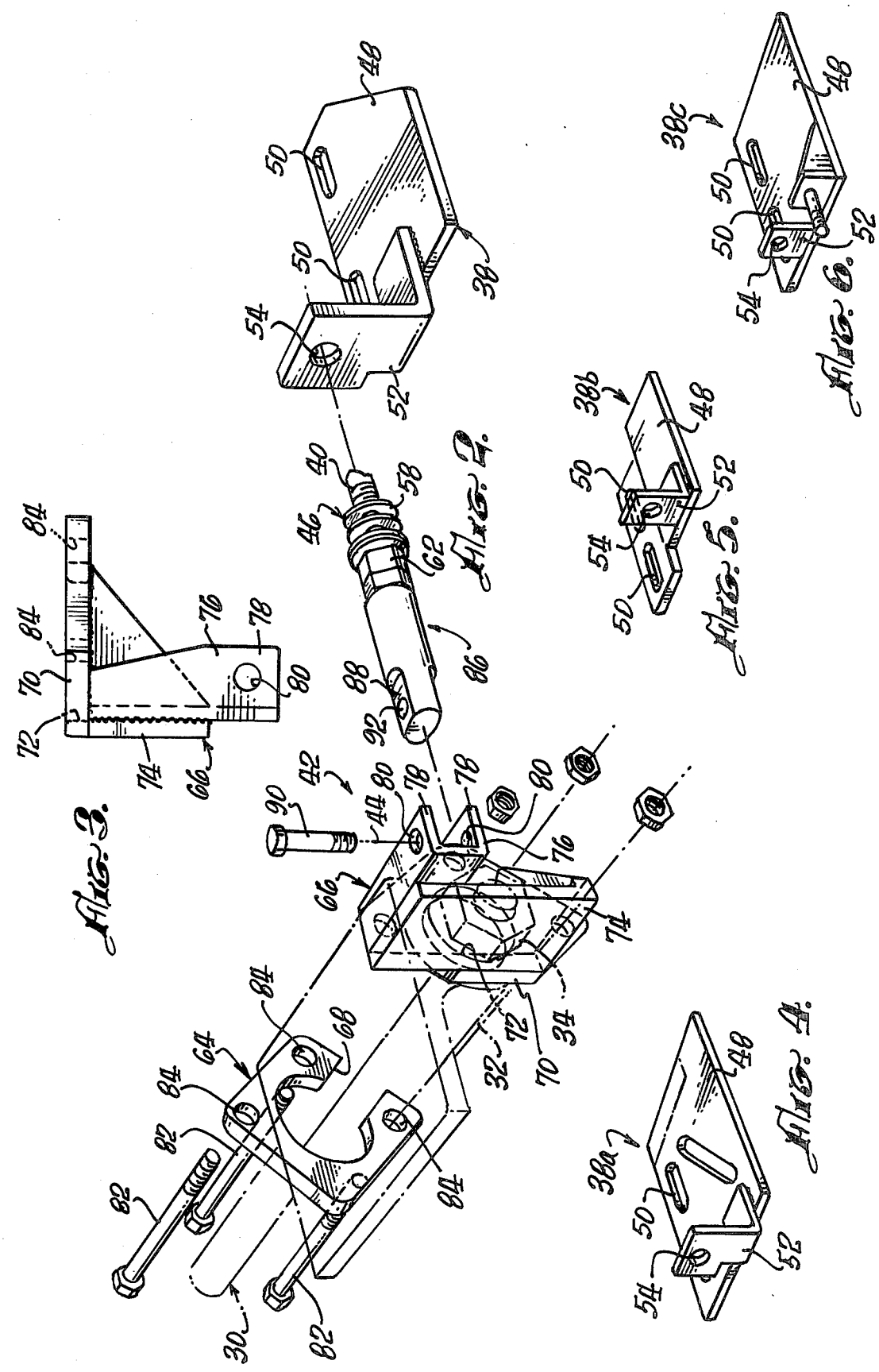

VEHICLE WHEEL STEERING STABILIZER

BACKGROUND OF THE INVENTION

1. Field of the Invention

This invention relates generally to steering stabilizers for automotive vechicles and more particularly to an improved steering stabilizer for automotive vehicles with a rigid front axle.

2. Prior Art

Simply stated, steering stabilizers are spring powered devices for exerting on the front steering wheels of an automotive vehicle, spring forces resisting external forces tending to turn the wheels about their steering axes. Steering stabilizers, while capable of use in all types of vehicles, are most commonly employed on large vehicles, such as trucks, to aid the drivers controlling the vehicles in the event of a blowout.

A wide variety of steering stabilizers have been devised. One example of such a stabilizer is described in U.S. Pat. No. 3,448,991. This particular patented stabilizer is designed for vehicles having an independent front wheel suspension system.

SUMMARY OF THE INVENTION

The steering stabilizer of this invention is designed for use on automotive vehicles with a rigid front axle pivotally mounting at its ends the front vehicle steering wheels. These wheels are turned in unison on their steering axes from the steering column through a steering linkage. The steering linkage includes tie rods pivotally connected at their outer ends to steering arms rigidly joined by king nuts to the front wheel steering knuckles.

The steering stabilizer of the invention is operatively connected between the front axle and a steering wheel king nut to exert a spring force on the wheel in offset relation to its steering axis for urging the wheel to a neutral position about the steering axis. In practice, each steering wheel is provided with a steering stabilizer.

The steering stabilizer of the invention comprises a stabilizer shaft slidable in a mounting bracket having means for connection to the front axle. The outer end of this stabilizer shaft is pivotally attached to a coupling for connection to a front wheel king nut.

Acting between the stabilizer shaft and the mounting bracket are spring means which urge the shaft endwise to a neutral position relative to the mounting bracket. The spring means thereby urge the front wheel to a neutral position about its steering axis.

One feature of the invention resides in the construction of the stabilizer king nut coupling means. Two different coupling constructions are described. One coupling clamps axially to the king nut and the other clamps laterally to the king nut.

Another feature of the invention is concerned with the attachment of the stabilizer mounting bracket to the rigid front axle. In the preferred embodiment, this bracket is attached to the axle by the shackle bolts which secure a front vehicle leaf spring assembly to the axle. The mounting bracket may be designed for use on various makes of automotive vehicles.

BRIEF DESCRIPTION OF THE DRAWINGS

FIG. 1 is a folded front elevation of a front wheel suspension system for a vehicle with a rigid front axle and equipped with front wheel steering stabilizers according to the invention;

FIG. 2 is an enlarged exploded perspective view of one steering stabilizer;

FIG. 3 is a further enlarged top plan view of one king nut clamp member of the stabilizer;

FIGS. 4, 5, and 6 are perspective views of stabilizer mounting brackets for installation in different makes of automotive vehicles;

DESCRIPTION OF THE PREFERRED EMBODIMENT

Figure 7:
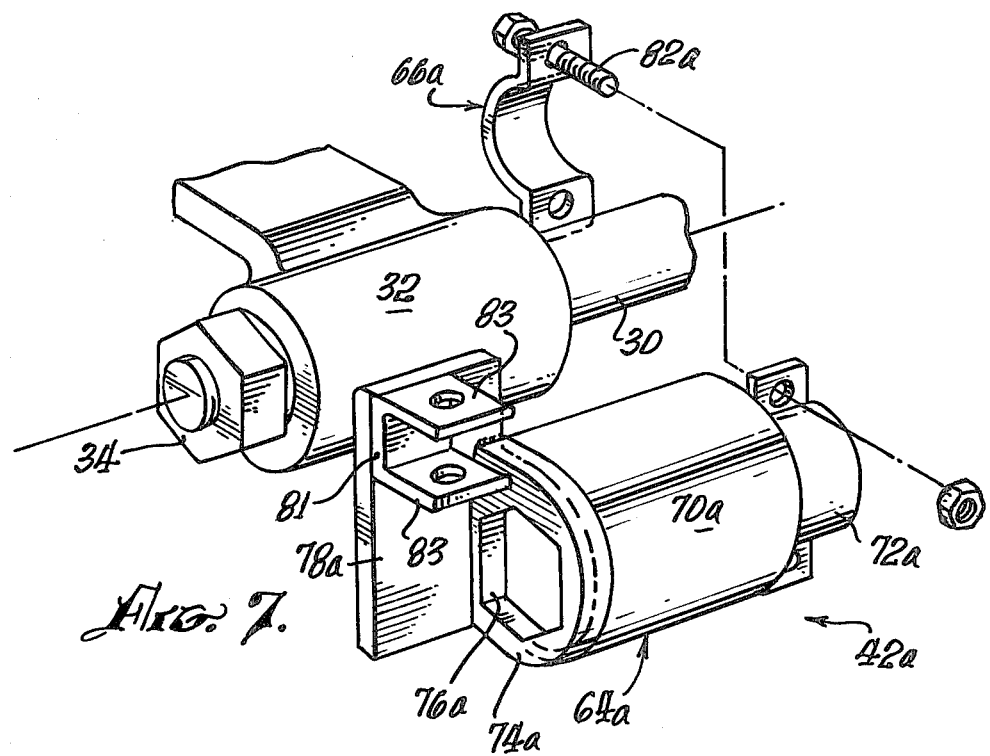
FIG. 7 is an exploded perspective view of a modified stabilizer king nut coupling according to the invention.

Referring first to FIGS. 1 through 3, reference numeral 10 denotes a typical rigid axle front end suspension system for a heavy duty vehicle, such as a truck. The front suspension system 10 is conventional and hence need not be described in elaborate detail.

Suffice it to say that the suspension system 10 includes a rigid front axle 11 having an underslung central portion 12 and elevated ends 14. These elevated axle ends are straddled vertically by yoke shapped front wheel steering knuckles 16 including outer horizontal spindles 18 for the front vehicle steering wheels (not shown). Bearing means 20 pivotally join the yoke arms 22 of each steering knuckle 16 to the corresponding axle end 14 for steering movement of the knuckle relative to the axle 11 about a generally vertical steering axis 24.

The vehicle chassis (not shown) is supported on the axle 11 by leaf spring assemblies 26. Each spring assembly 26 is attached at its ends to the chassis by spring shackles (not shown) and at its center to the axle 11 by U-bolts 28 which extends through upper flanges 29 (only one shown) of the axle.

The front wheel steering knuckles 16, and hence the front vehicle wheels are turned in their steering movement about their steering axes 24 by rotation of a steering column (not shown) connected by steering linkage to the steering knuckles, in the usual way. This steering linkage includes tie rods (not shown) pivotally connected to steering arms 30 rigidly joined to the steering knuckles. The steering arms extend pivotally from and transverse to the steering axis 24 of the steering knuckle 16.

Steering arms 30 are rigidly secured to the steering knuckles 16 by so-called king nut 32 rigid on the steering knuckles. The front ends of the steering arms are threaded in the king nuts. Jamb nuts 34 are threaded on the front ends of the arms to secure the latter against turning in the king nuts.

The front wheel steering system just described is conventional. Accordingly, no further description of the steering system is necessary. Moreover, only the steering arms 30, king nuts 32, and jamb nuts 34 of the steering system have been shown in the drawings.

This invention provides steering stabilizers 36 for the front steering wheels. Each front wheel is provided with a steering stabilizer 36.

Each steering stabilizer 36 comprises a mounting bracket 38 secured to the axle 11. A stabilizer shaft 40 extends loosely through the bracket for endwise movement relative to the bracket in the endwise direction of the axle 11. The outer end of the stabilizer shaft 40 is pivotally connected by coupling means 42 to the corresponding front wheel king nut 32. The pivot axis 44 of the coupling means 42 is parallel to and spaced laterally from the corresponding front wheel steering axis 24.

Surrounding the stabilizer shaft 40 are spring means 46 which urge the shaft axially to a neutral position relative to the stabilizer bracket 38. Spring means 46 thereby also urge the corresponding front wheel steering knuckle 16 to a neutral position about its steering axis 24. The two front wheel steering stabilizers 36 are constructed and arranged to urge the front vehicle wheels to neutral positions wherein the vehicle steers straight ahead.

Referring in more detail to the particular steering stabilizer shown in FIGS. 1 through 3, the stabilizer bracket 38 comprises a mounting plate 48 with holes 50 for receiving the corresponding spring shackle bolts 28. The bracket is installed by removing the shackle bolt nuts 49, placing the bracket plate 48 over the lower bolt ends and against the underside of the corresponding axle flange 29, and then replacing the nuts on the bolt ends to firmly clamp the plate against the axle. Upstanding from the bracket plate 48 is a rigid, narrow finger like flange 52. This flange has a hole 54 sized to loosely receive the stabilizer shaft 40.

Mounting bracket flange 52 is so located on the bracket plate 48 that when the mounting bracket 38 is installed on the vehicle axle 11, the flange is located at the front side of and projects above the axle, as shown. In this regard, it is significant to note that the stabilizer mounting bracket 38 may be configured for installation on various makes of automotive vehicles. FIGS. 4 through 6, for example, illustrate three different bracket configurations indicated by reference numbers 38a, 38b, and 38c suitable for installation on INH trucks, White Freightliner trucks, and Mack trucks respectively.

The stabilizer shaft 40 extends through the bracket opening 54, generally parallel to the axle 11. The stabilizer spring means 46 comprise a pair of coil springs 56, 58, surrounding the shaft 40 at opposite sides of the mounting bracket flange 52. Spring 6 is located between and seats against the bracket flange 52 and a shoulder 60 on the inner end of the shaft. Spring 58 is located between and seats against the bracket flange and a shoulder 62 on the outer end of the shaft.

Stabilizer coupling means 42 comprises a pair of king nut clamps 64, 66 which straddle the corresponding front wheel king nut 32 endwise. Bear clamp 64 is a generally C-shaped clamp plate for seating against the rear end of the king nut in surrounding relation to the corresponding steering arm 30. Clamp plate 64 has a lateral slot 68 to permit placement of the plate above the steering arm.

Front clamp member 66 comprises a clamp plate 70 for seating against the front end of the corresponding front wheel king nut 32. This clamp plate has a central clearance opening 72 for the steering arm jamb nut 34. Along one edge of the clamp plate 70 is a rigid right angle flange 74 to the upper end of which is welded a channel 76. Channel 76 has flanges 78 with aligned holes 80.

Clamp plates 64, 70 are joined by bolts 82 which extend through holes 84 in the plates. These bolts are tightened to firmly clamp the members 64, 66 endwise to the front wheel king nut 32.

On the outer end of the stabilizer shaft 40 is a fitting 86 with a flat end 88 positioned between the flanges 78 of the corresponding front clamp member channel 76. The stabilizer shaft is pivotally secured to the channel 76 by a pivot pin 90 which extends through the channel flange holes 80 and a hole 82 in the shaft fitting 86. The pivot connections 90 between the stabilizer shaft 40 and the front clamp member 66 has its pivot axis (axis 44) laterally spaced from the steering axis 24 of the corresponding front wheel steering knuckle 16, as noted earlier and shown in the drawings.

It will now be understood that the springs 56, 58 of the two front wheel steering stabilizers 36 urge the front steering knuckles 16 and thereby the front steering wheels to straight ahead neutral positions. The stabilizers thus provide stabilizing forces on the front wheels which counteract external forces on these wheels, such as those encountered during a blowout.

Figure 8:
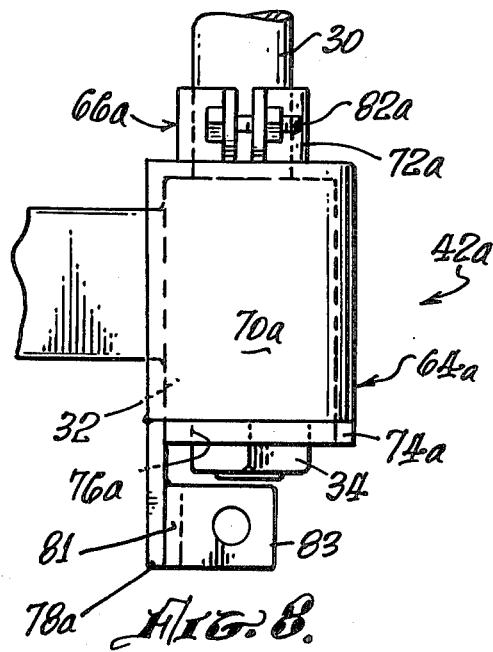
FIG. 8 illustrates the coupling of FIG. 7 installed in the king nut.
Figure 9:
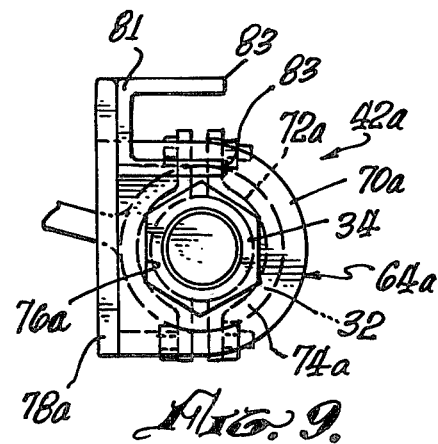
FIG. 9 is an end view of the coupling in FIG. 8.

FIGS. 7 through 9 illustrate an alternative coupling means 42a for pivotally connecting the shaft 40 of each front wheel stabilizer to its respective front wheel king nut 32. Coupling means 42a comprises a pair of clamp members 64a, 66a for straddling the king nut 32 and its steering arm 30 laterally. Clamp screws 82a join the clamp members to secure the coupling to the king nut 32.

Clamp member 64a comprises a half-sleeve 70a for fitting about the inner side of the king nut 32 and a clamp yoke 72a rigid on the rear end of the half-sleeve 70a. Rigid on the front end of the half-sleeve 70a is a plate 74a containing a hexagonal opening 76a for receiving the corresponding steering arm jamb nut 34. A right angle flange 78a is rigidly joined to the plate 74a and mounts a channel 81a with apertured flanges 83a. These flanges straddle and are pivotally connected to the stabilizer shaft end fitting 86 in the same manner as described earlier in connection with FIGS. 1 through 3.

Clamp member 66a is a clamp yoke similar to the clamp yoke 72a on the clamp member 64a. Clamp yokes 66a, 72a are joined by the clamp screws 82a and surrounding clamping engagement with the steering arm 30 to secure the coupling means 42a to the king nut 32.

The inventor claims:

1. In a vehicle having a rigid front axle, leaf spring assemblies attached to said axle for resilient supporting of the vehicle chassis on said axle, front steering wheel knuckles pivotally mounted on the ends of said axle for steering movement about steering axes, and steering linkage including king nuts secured to said steering knuckles for turning the latter in their steering movement about said steering axes, the improvements comprising:

a steering stabilizer pivotally connected between said axle and each king nut including spring means for yieldably biasing the corresponding front wheel steering knuckle to a neutral position about its steering axis, each steering stabilizer comprising a bracket secured to said axle, a stabilizer shaft extending generally end-wise of said axle and loosely through said bracket for end-wise movement relative to said bracket, said shaft having an outer end adjacent the king nut for the corresponding front wheel steering knuckle, and coupling means pivotally connecting said outer shaft end to the respective king nut with the pivot axis of said coupling means generally parallel to and spaced forwardly of the steering axis of the corresponding steering knuckle, and said spring means urging said shaft end-wise to a neutral position relative to said bracket.

2. The subject matter of claim 1 wherein:

said coupling means comprises a pair of clamp members straddling the respective king nut, clamp screws joining said clamp members in clamping engagement with said king nut, and a pivot connection between the outer end of said shaft and one of said clamp members.

3. The subject matter of claim 2 wherein:

said clamp members comprise clamp plates seating against opposite ends of said king nut and straddling said king nut endwise.

4. The subject matter of claim 3 wherein:

said steering linkage includes a steering arm secured to and extending rearwardly from each king nut and a jamb nut threaded on said steering arm at the front end of the respective king nut, one of said clamp members of each steering stabilizer comprises a C-shaped clamp plate seating against the rear end of the corresponding king nut in surrounding relation to its respective steering arm, the other clamp member of each steering stabilizer comprises a clamp plate seating against the front end of the corresponding king nut and having a central opening receiving the respective steering arm jamb nut, and a right angle flange on the latter clamp plate, and said coupling means of each steering stabilizer further comprises a pivotal connection between the corresponding stabilizer shaft and front clamp member flange.

5. The subject matter of claim 2 wherein:

said steering linkage further includes a steering arm secured to and extending rearwardly from each king nut and a jamb nut threaded on said steering arm at the front end of the corresponding king nut, one of said clamp members of each steering stabilizer comprises a half-sleeve fitting about the inner side of the corresponding front wheel king nut, a clamp yoke rigid on the end of said half-sleeve and partially surrounding the corresponding steering arm, a front plate secured to the front end of said half-sleeve and having a central opening receiving the corresponding steering arm jamb nut, and a right angle flange of said plate, the other clamp member of each steering stabilizer comprises a clamp yoke secured to said first mentioned clamp yoke in surrounding relation to the corresponding steering arm but rigidly securing said clamp members to the corresponding front wheel king nut, and said coupling means of each steering stabilizer further comprises a pivotal connection between said stabilizer shaft and said coupling flange.

6. The subject matter of claim 5 wherein:

said mounting bracket of each steering stabilizer has a flange through which said stabilizer shaft extends, and said spring means of each steering stabilizer comprises a pair of coil springs surrounding said stabilizer shaft at opposite sides of said flange and acting between said flange and shoulders on said shaft.

7. The subject matter of claim 4 wherein:

said mounting bracket of each steering stabilizer has a flange through which said stabilizer shaft extends, and said spring means of each steering stabilizer comprises a pair of coil springs surrounding said stabilizer shaft at opposite sides of said flange and acting between said flange and shoulders on said shaft.

8. A steering stabilizer for an automotive vehicle having a rigid front axle pivotally mounting steering knuckles at its ends for steering movement of said knuckles relative to said axle about steering axes, and steering linkage including king nuts secured to said steering knuckles for turning said steering knuckles about their steering axes, comprising:

a mounting bracket having an apertured mounting plate for attachment to said axle and an apertured right angle flange on said mounting plate, a stabilizer shaft extending loosely through said flange, springs surrounding said shaft at opposite sides of said flange and acting between said flange and shoulders on the ends of said shaft for urging said shaft endwise to a neutral position relative to said flange, and king nut coupling means pivotally mounted on one end of said shaft on a pivot axis forwardly of said steering axis and transverse to said shaft including clamp members for clamping engagement with a front wheel king nut.

9. The subject matter of matter of claim 8 wherein:

one of said clamp members comprises a C-shaped clamp plate, the other clamp member comprises a clamp plate having a central opening and a right angle flange rigid on the latter plate, and said coupling means further comprises clamp screws joining said clamp plates and a pivotal connection between said clamp plate flange and said stabilizer shaft.

10. The subject matter of claim 8 wherein:

one of the clamp members comprises a half-sleeve, a clamp yoke rigid on one end of said half-sleeve, a plate transverse to the axis and rigid on the opposite end of said half-sleeve, and a right angle flange on said latter plate, the other clamp member comprises a clamp yoke opposite said first mentioned clamp yoke, and said coupling means further comprises clamp screws joining said clamp yokes, and a pivotal connection between said clamp plate flange and said stabilizer shaft.

* * * * *